No. 741,596. PATENTED OCT. 13, 1903.
W. F. SHEPPARD.
HARROW OR SIMILAR IMPLEMENT.
APPLICATION FILED MAR. 2, 1903.
NO MODEL.

Witnesses
Guy V. Worthington

Inventor
Wm. F. Sheppard
By H. B. Willson
Attorney

THE NORRIS PETERS CO., PHOTO-LITHO., WASHINGTON, D. C.

No. 741,596. Patented October 13, 1903.

UNITED STATES PATENT OFFICE.

WILLIAM F. SHEPPARD, OF WASHINGTON, DISTRICT OF COLUMBIA.

HARROW OR SIMILAR IMPLEMENT.

SPECIFICATION forming part of Letters Patent No. 741,596, dated October 13, 1903.

Original application filed October 27, 1902, Serial No. 128,962. Divided and this application filed March 2, 1903. Serial No. 145,754. (No model.)

*To all whom it may concern:*

Be it known that I, WILLIAM F. SHEPPARD, a citizen of the United States, residing at Washington, in the District of Columbia, have invented certain new and useful Improvements in Harrows or Similar Implements; and I do declare the following to be a full, clear, and exact description of the invention, such as will enable others skilled in the art to which it appertains to make and use the same.

My invention relates to improvements in convertible harrows and cultivators; and it consists in the peculiar construction and combination of devices hereinafter fully described and claimed.

This invention is a division of my application for Letters Patent of the United States filed October 27, 1902, Serial No. 128,962.

The object of my present invention is to effect improvements in the construction of the adjusting-lever employed to adjust the teeth or shovels.

Figure 1:
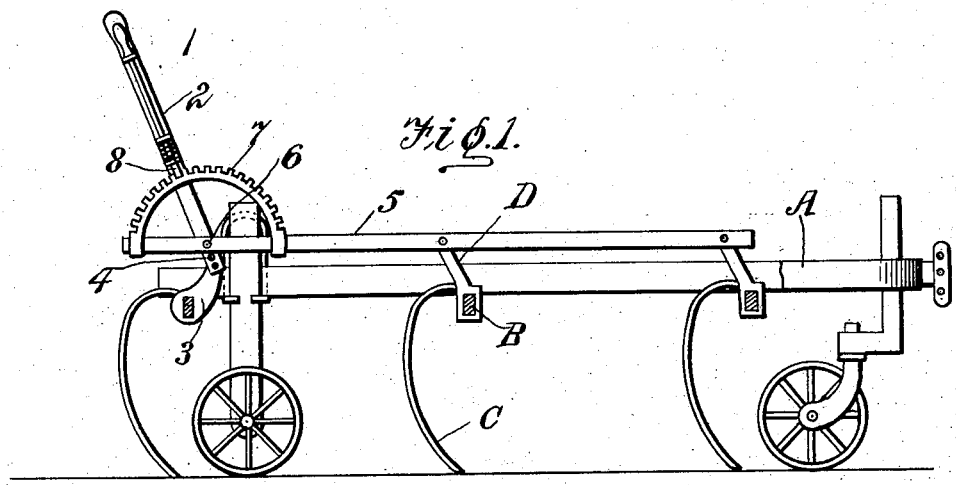
Figure 2:
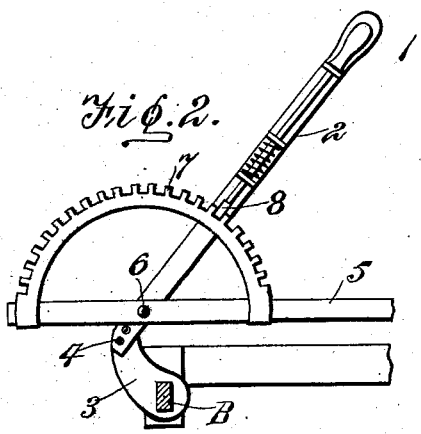

In the accompanying drawings, Figure 1 is a vertical longitudinal sectional view of the convertible harrow and cultivator embodying my improvements. Fig. 2 is a detail view of the same, showing a different arrangement of the adjusting-lever.

Within the scope of my present improvements the harrow or cultivator to which my improved adjusting-lever is attached may be of any suitable construction.

In the convertible harrow and cultivator here shown, A represents the frame; B, the cross-bars, which carry the cultivator or harrow teeth C, and certain of the said cross-bars which are journaled in suitable bearings with which the frame is provided are provided with rock-arms D. One of the said cross-bars or rock-shafts is provided with an adjusting-lever 1, the same comprising an upper section 2 and a lower section 3, detachably connected thereto and here shown as connected thereto by bolts 4. The upper section of the lever is pivotally connected to a link 5, as by a bolt 6, and the said link is also pivotally connected to the rock-arms D. The lower section 3 of the lever is of substantially quadrant shape and is provided with an opening corresponding in size and shape to the cross-sectional area of one of the rock-shafts, so that the latter may be passed through the said openings. The said lower section of the adjusting-lever is reversible—that is to say, it may be disposed to extend either to the front or the rear of the rock-shaft to which it is connected, as shown in Figs. 1 and 2. When the lower section of the lever is disposed as shown in Fig. 2, shorter harrow or cultivator teeth may be employed than when the adjusting-lever is disposed as shown in Fig. 1. The link 5 is provided with a segment-rack 7, and the adjusting-lever is provided with a spring-pressed locking-dog 8 of the usual construction to coact with the segment-rack, and hence secure the adjusting-lever at any desired adjustment. Since the adjusting-lever is pivoted to the link-rod, which is connected to the rock-arms of certain of the rock-shafts, said lever is provided with a shiftable fulcrum, as will be understood.

From the foregoing description, taken in connection with the accompanying drawings, the construction, operation, and advantages of my invention will be readily understood, it is thought, without requiring a more extended explanation.

I do not desire to limit myself to the precise construction and combination herein shown and described, as it is obvious that modifications may be made therein without departing from the spirit of my invention and within the scope of the appended claims.

Having thus described my invention, I claim—

1. In an implement of the class described, the combination of a tooth-carrying rock-shaft, with a lever having a segmental lower portion detachably connected to the rock-shaft, and a shiftable fulcrum for the said lever, substantially as described.

2. In an implement of the class described, the combination of a plurality of tooth-carrying rock-shafts, a lever having a quadrant-shaped lower portion detachably connected to one of the rock-shafts, rock-arms on the other rock-shafts, and a link-rod connecting the said rock-arms and lever together, said link-rod forming a shiftable fulcrum for the latter, substantially as described.

3. In combination, in an implement of the class described, with a tooth-carrying rock-shaft, a lever having a detachably reversible quadrant-shaped lower section, detachably connected to the rock-shaft, and a shifting fulcrum for the said lever, substantially as described.

In testimony whereof I have hereunto set my hand in presence of two subscribing witnesses.

WILLIAM F. SHEPPARD.

Witnesses:
J. C. WILLSON,
BENJ. G. COWL.